June 26, 1951   J. J. NOCKUNAS   2,558,192
SOLDERING BIT
Filed Dec. 20, 1948

John J. Nockunas,
Inventor.
Haynes and Koenig
Attorneys.

Patented June 26, 1951

2,558,192

UNITED STATES PATENT OFFICE 2,558,192

SOLDERING BIT

John J. Nockunas, St. Louis, Mo.

Application December 20, 1948, Serial No. 66,339

6 Claims. (Cl. 219—26)

This invention relates to soldering bits, and with regard to certain more specific features, to such bits for portable electric soldering guns such as shown, for example, in U. S. Patent No. 2,405,866.

Among the several objects of the invention may be noted the provision of a quick-heating soldering bit for electric soldering guns and the like which has improved life and wearing qualities and which will effect a faster and superior application of solder to a wide variety of locations; and the provision of an economical article of manufacture of this class which may be conveniently interchanged on soldering guns. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is a perspective view showing application to a soldering gun of one form of the invention;

Similar reference characters indicate corresponding parts throughout the several views of the drawings.

Figure 1:
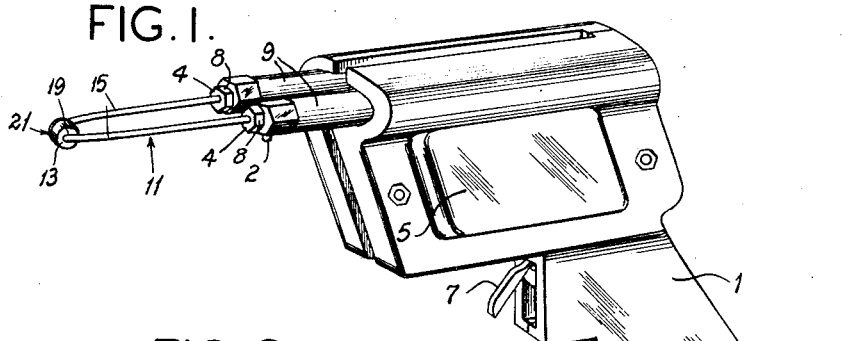
Figure 8:
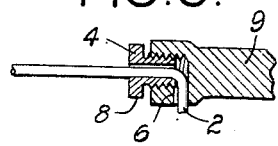
Fig. 8 is an enlarged detail section of connecting means that may be employed between a bit and a soldering gun.

In Fig. 1 is illustrated a so-called electric soldering gun consisting, for example, of a pistol grip 1. An extension cord 3 supplies alternating current. Carried by the grip is a transformer case 5 in which is a transformer for converting a relatively high-voltage, low-ampere supply current to a relatively low-voltage, high-ampere operating current. A trigger 7 controls a switch in the feed circuit from cord 3 to the primary of the transformer. At 9 are shown electrodes which form terminals of the secondary circuit of the transformer. Each electrode is in the form of a threaded socket, as shown in Fig. 8. Near the bottom of each socket is a lateral hole 6 for the reception of a bent end forming a hook 2 of former bits or of one of the bits to be described. Threaded bushings 4, which are slipped onto the prongs of the electrode (before the hooks 2 are bent into shape) are threadable into the sockets after said hooks have been bent into shape and inserted into the openings. The bushings have wrench-engaging portions 8 by means of which they may be tightened into the sockets to engage the hooks 2 to make a solid electrical contact.

Heretofore, the soldering bits which carry the hooks 2 have been formed as plain hairpin-shaped conducting elements composed of, for example, No. 8 soft copper wire or a suitable alloy, often referred to as soldering tips. These constitute resistance heating elements responsive for the purpose to the current and voltage applied. By closing the switch 7, the tip heretofore was heated at the hairpin turn (as elsewhere) and the turn was used for soldering. The above description is primarily of known elements and indicates the background of the invention (see also said Patent 2,405,866).

The prior plain hairpin-shaped conductors used as heating elements were very quickly worn out due to abrasion at the hot hairpin turns caused by rubbing (in the presence of liquid solder) on the surface to be soldered. Wear was accelerated by rapid scaling at the hot rubbing surfaces. For example, several bits a day might be used in continuous operation. Moreover, the hairpan shape of the bit was not advantageous for many operations, such as, for example, applying solder to tinning of a wire, bead or curved configurations.

Figure 2:
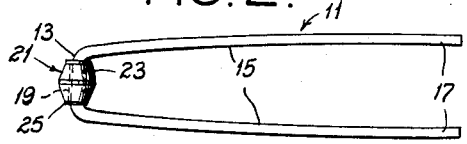
Fig. 2 is a plan view showing details of the form of the invention illustrated in Fig. 1.
Figure 3:
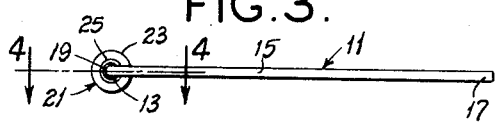
Fig. 3 is a side elevation of Fig. 2.
Figure 4:
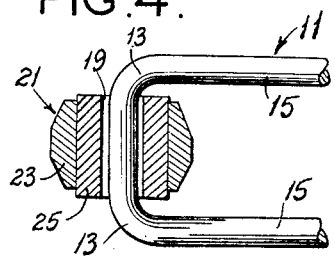
Fig. 4 is an enlarged cross section taken on line 4—4 of Fig. 3.

Referring now more particularly to Figs. 2-4, which show an article of manufacture constituted by one form of my invention per se, numeral 11 indicates a loop of conductor made, for example, of No. 8 copper wire or suitable alloy. This loop is of hairpin shape which has a hairpin turn at 13 located between two legs 15. For initial sale the ends 17 of the legs 15 may be left straight. Before the wire which forms the hairpin shape is bent at the hairpin turn 13, it is inserted through an opening 19 of a roller 21. After bending, the roller may rotate freely on the hairpin turn as a journal, being axially held captive at the hairpin turn 13 by the legs 15.

The roller 21 is preferably composite, being formed by an outer barrel-shaped sleeve 23, composed preferably of brass. Force-fitted into the brass sleeve 23 is a cylindric copper sleeve 25, which forms a bearing around the hairpin turn or journal 13 of the wire 11.

The assembly in the shape shown in Figs. 2–4 may be sold as an article of commerce. Hooks such as 2 are left for the purchaser to bend into operating positions after application to the legs 15 of the bushings 4. The hooks 2 may not be necessary because some soldering guns do not require them for application of bits of this nature. In the latter case the bits are simply pushed into spring sockets in the electrodes 9 or openings with which cooperate threaded split bushings. Thus it will be seen that the ultimate use of straight or hooked ends at 17 is optional.

The user applies the assembly of Figs. 2–4 to the gun, with the result shown in Fig. 1, wherein the conductor 11 is in the secondary circuit of the transformer. By operating switch 7, current flows through the conductor 11 and heats it, thus also heating the roller 21. The bushing may then be rolled in the solder to be applied, thus distributing the latter.

Figure 5:
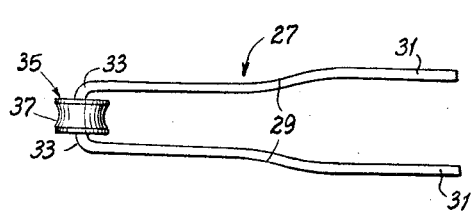
Figs. 5 and 6 are views similar to Figs. 2 and 3, respectively, showing another form of the invention.
Figure 7:
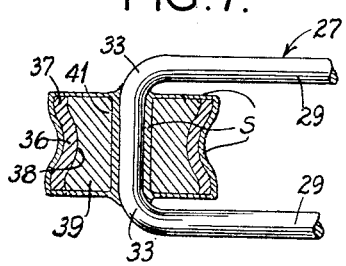
Fig. 7 is an enlarged cross section taken on line 7—7 of Fig. 6, but illustrating conditions of the device during use.
Figure 6:
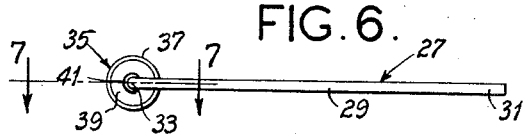

In Figs. 5–7 is shown another form of the invention in which the conductor, as indicated at 27, is bent into a hairpin shape, the legs 29 of which have an additional curve in them. As before, the ends 31 are for application to the electrodes 9, either with or without a bend such as 2, depending upon the type of soldering gun to which the conductor is applied. The hairpin journal-forming turn is shown at 33. In this case the roller is shown at 35 and is in the form of a brass sleeve 37 around a copper bushing 39, the latter having a turning fit 41 around the journal 33. The exterior shape of the sleeve is in this case like an hour glass, the sleeve being rolled at 36 into a groove 38 in the bushing 39. Other cylindric or non-cylindric exterior shapes of roller bushings may be employed, depending upon the character of the soldering to be accomplished. For example, the convex form shown in Fig. 4 is preferable for fillets and the like. The concave form shown in Fig. 7 is preferable for soldering along convex surfaces such as beads, wires, etc. Appropriate cylindric, beaded, grooved and like rollers may be used under appropriate circumstances.

After the first soldering operation, which of course occurs in the presence of a suitable fluxing agent, the roller and the hairpin turn become tinned and coated with solder, which enters into the space between these parts. Hence, when the bit is taken out of use, the solder cools and forms a solid connecting mass between the hairpin-turn journal and the roller, as illustrated in Fig. 7. This action is encouraged by making both the bushing and the material in the hairpin turn of material to which hardened solder will adhere or tin. The purpose of this is to provide a highly heat-conductive solid agent (solder) between the hairpin turn and the roller bushing, so that when the current is first turned on, a quick transfer of heat will be obtained from the wire to the bushing. Promptly after the initial heating, the solder melts, but since a substantial amount of it is capillarily retained between the roller and the hairpin turn, it also forms a liquid conductor of heat. Thus it is very quickly ready and remains in condition for a rolling soldering operation after the trigger 7 is operated. One requirement for assuring that solder will enter the space between the roller and journal is that the roller shall be small; otherwise, the solder would attach itself to the edge of the roller only, without creeping to the cylindric space around the journal. By having a small roller, creep is assured of solder from the periphery of the roller across its ends and into the journal openings, the latter by capillary action. The manner in which this progress may occur is illustrated by the film of solder which is illustrated at S in Fig. 7.

The outside diameter of the composite roller bushing should be relatively small to avoid a long path of heat conduction and to minimize heat loss. For a No. 8 gage wire as above described, a suitable outside roller diameter is of the order of ¼-inch to ⅜-inch or so. A suitable inside diameter is ⅛-inch or so, with about ³⁄₆₄-inch capillary clearance around the wire. The reason for forming the sleeve 23 or 37 of brass is that this material better holds up against wear in the presence of the acid in acid core solder than copper, which forms the sleeve 25 or 39.

From the above it will be seen that the composite roller provides not only for a better distribution of solder, but that it is very quickly heated from a cold condition. The subsequent presence of melted solder between the bushing and the hairpin turn acts as a lubricant and inhibits scaling due to oxidation. Any scale that may form on the journal is carried to the surface of the solder and washed out. Thus maximum conduction of heat from the wire to the roller is maintained at all times. And, most important, the roller bushing reduces direct frictional rubbing upon any scaling hot wire which heretofore quickly wore through. By use of the invention, the number of bit replacements required for continuous operations has been reduced from several per day to one per week.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A bit for electric soldering guns and the like comprising a length of electrical conductor of hairpin shape having a hairpin turn and adjacent legs for attachment to electrodes, the hairpin turn forming a journal, and a heat-conducting roller carried with clearance by said journal and held axially captive by said legs, said conductor and roller being composed of materials at the journal adapted to be tinned by solder, and the roller being sufficiently small in diameter so that solder from a soldering operation is continuously supplied to said clearance.

2. A bit for electric soldering guns and the like comprising a length of copper conductor of hairpin shape having a hairpin turn and adjacent legs for attachment to electrodes, the hairpin turn forming a journal, and a small roller carried by said journal and held axially captive by said legs which roller effectively conducts heat to its periphery from the journal, said roller being composed of copper at least in its regions adjacent the conductor.

3. A bit for electric soldering guns and the like comprising a length of copper conductor of hairpin shape having a hairpin turn and adjacent legs for attachment to electrodes, the hairpin turn forming a journal, and a heat-conducting roller carried by said journal and held axially captive by said legs, said roller comprising a non-cylindric outside brass sleeve and an inner cylindric copper bushing.

4. A bit for electric soldering guns and the like comprising a length of conductor of hairpin shape having a hairpin turn and adjacent legs for attachment to electrodes, the hairpin turn forming a journal, and a heat-conducting roller carried by said journal and captive between said legs, the diameter of the roller being small enough for sufficient transmission of heat from the journal to the rim of the roller for soldering operations when the hairpin turn and surrounding parts of the roller are tinned, the conductor and roller being composed of materials at the turn and in said surrounding parts of the roller adapted to be tinned.

5. A bit for electric soldering guns and the like comprising a length of electrical conductor of hairpin shape having a hairpin turn and adjacent legs for attachment to electrodes, the hairpin turn forming a journal, and a small heat-conducting roller carried by said journal and held axially captive by said legs, the roller and the journal being composed of materials adapted to be solder tinned and having a clearance therebetween to effect an infilling containment for the tinning solder, the diametral size of the roller being such that some of the hot solder in which the roller may be rolled will automatically find its way into position between the roller and the journal.

6. A bit for electric soldering guns and the like comprising a length of electrical conductor of hairpin shape having a hairpin turn and adjacent legs for attachment to electrodes, the hairpin turn forming a journal, and a small heat-conducting roller carried by said journal and held axially captive by said legs, the roller and the journal being composed of materials adapted to be solder tinned and having a clearance therebetween to effect an infilling containment for the tinning solder, the diametral size of the roller being such that some of the hot solder in which the roller may be rolled will automatically find its way into position between the roller and the journal, the roller comprising an external sleeve and an internal bushing.

JOHN J. NOCKUNAS.

REFERENCES CITED

The following references are of record in the file of this patent:

UNITED STATES PATENTS

| Number | Name | Date |
| --- | --- | --- |
| 234,184 | Hendrick | Nov. 9, 1880 |
| 1,985,492 | Frohmuth et al. | Dec. 25, 1934 |
| 2,044,263 | Stoyan | June 16, 1936 |
| 2,359,393 | Sloan | Oct. 3, 1944 |
| 2,397,348 | Haines et al. | Mar. 26, 1946 |
| 2,405,866 | Weller | Aug. 13, 1946 |
| 2,443,749 | Stunkel | June 22, 1949 |

FOREIGN PATENTS

| Number | Country | Date |
| --- | --- | --- |
| 117,655 | Great Britain | July 22, 1918 |